Figure 19:
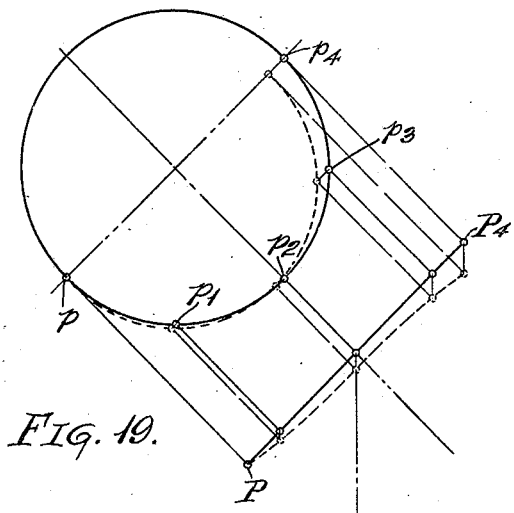

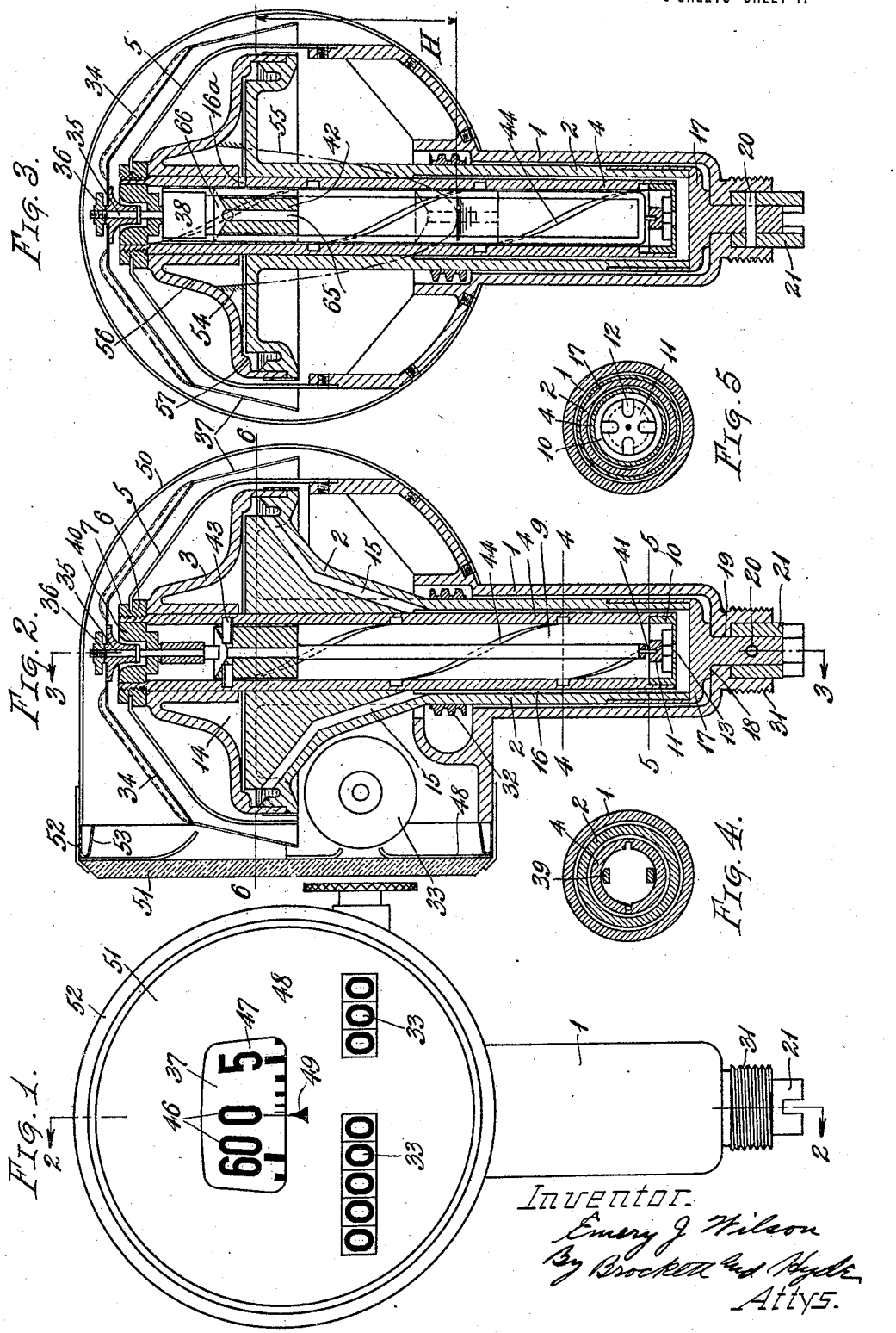

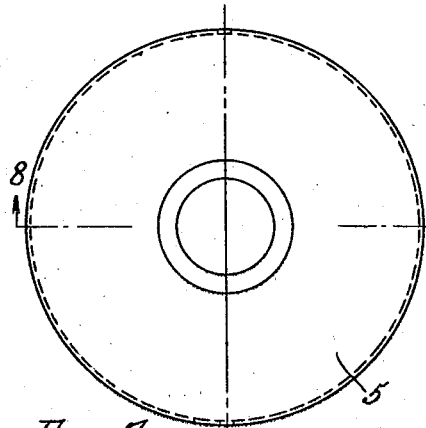
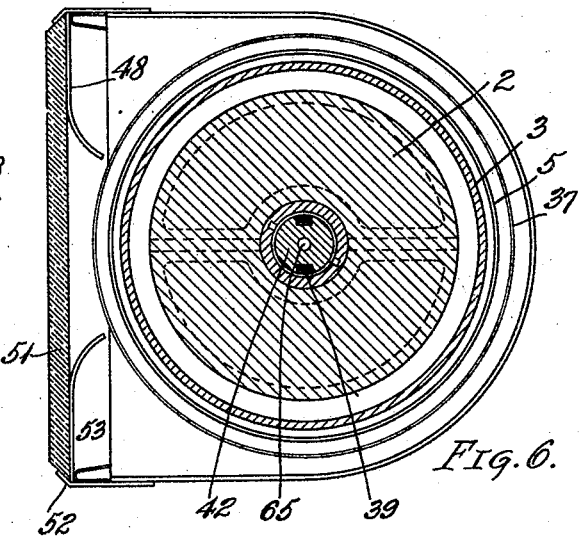
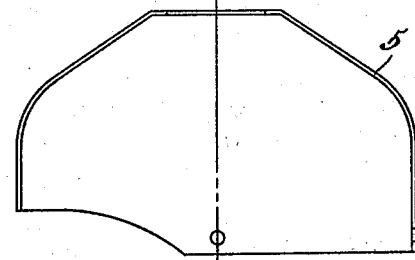
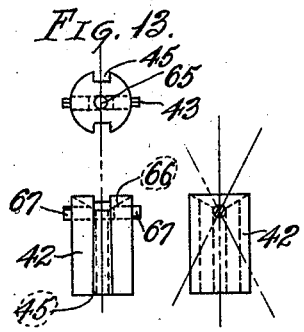
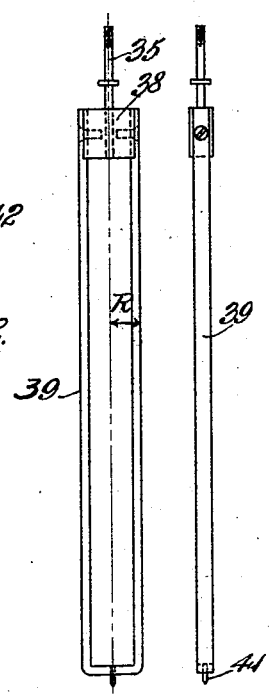
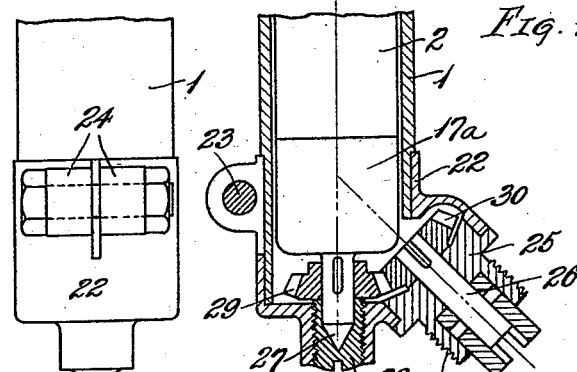

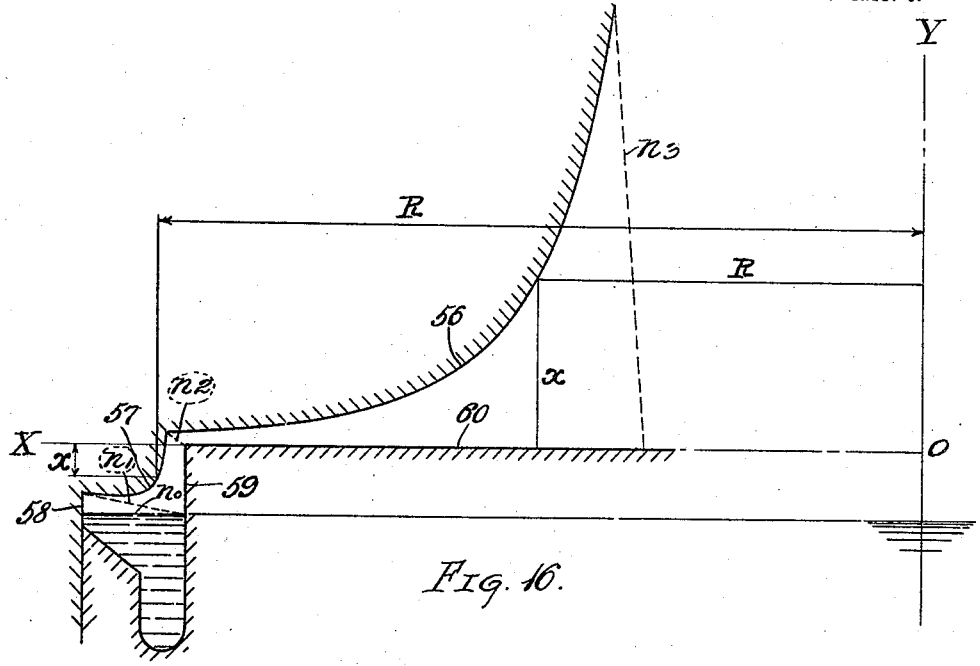
FIG. 16.
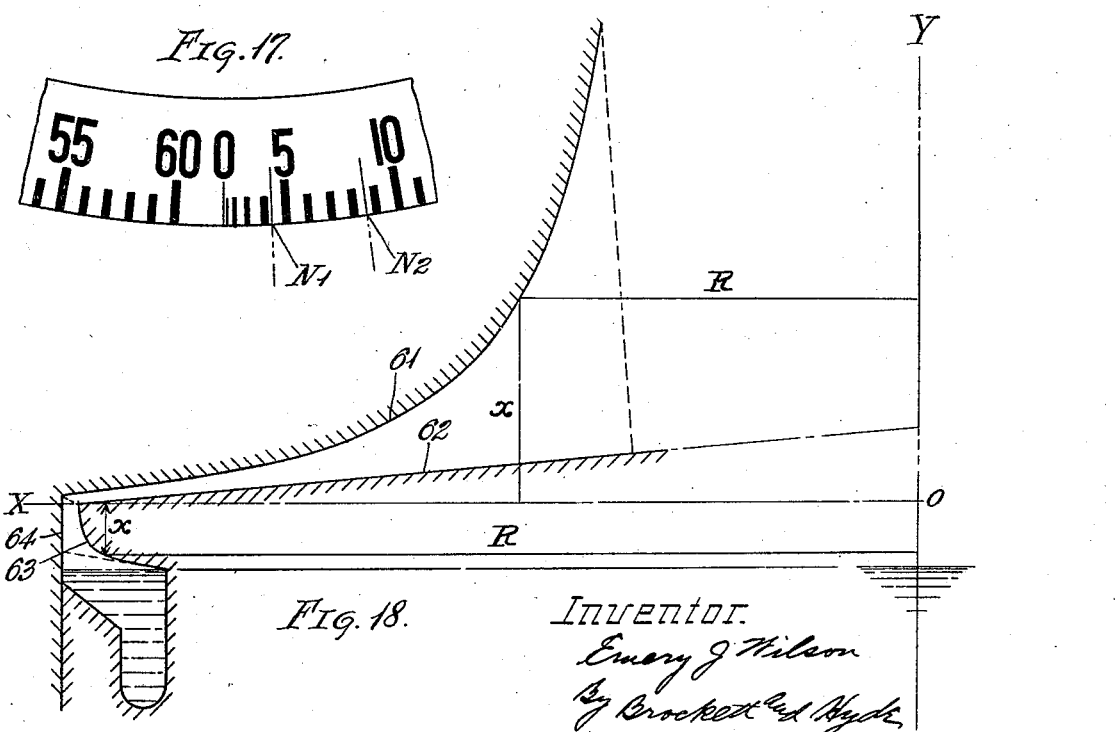
FIG. 17.
FIG. 18.

E. J. WILSON.
ROTARY SPEED INDICATOR.
APPLICATION FILED JUNE 24, 1918.

1,416,084.

Patented May 16, 1922.
6 SHEETS—SHEET 4.

Inventor.
Emery J. Wilson
By Brockett and Hyde
Attys.

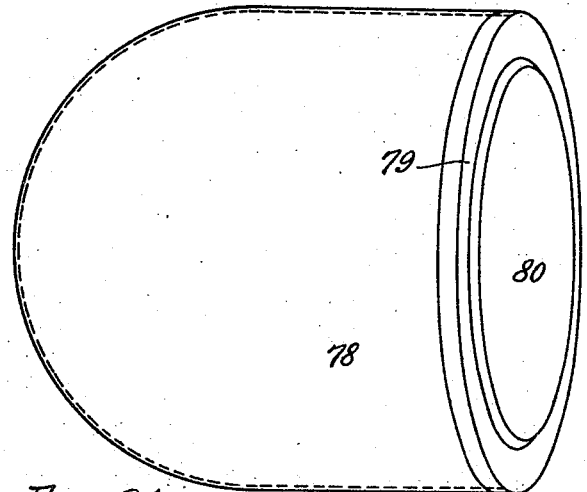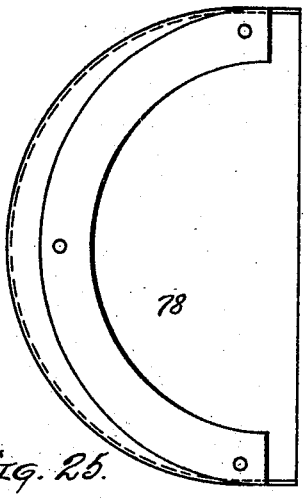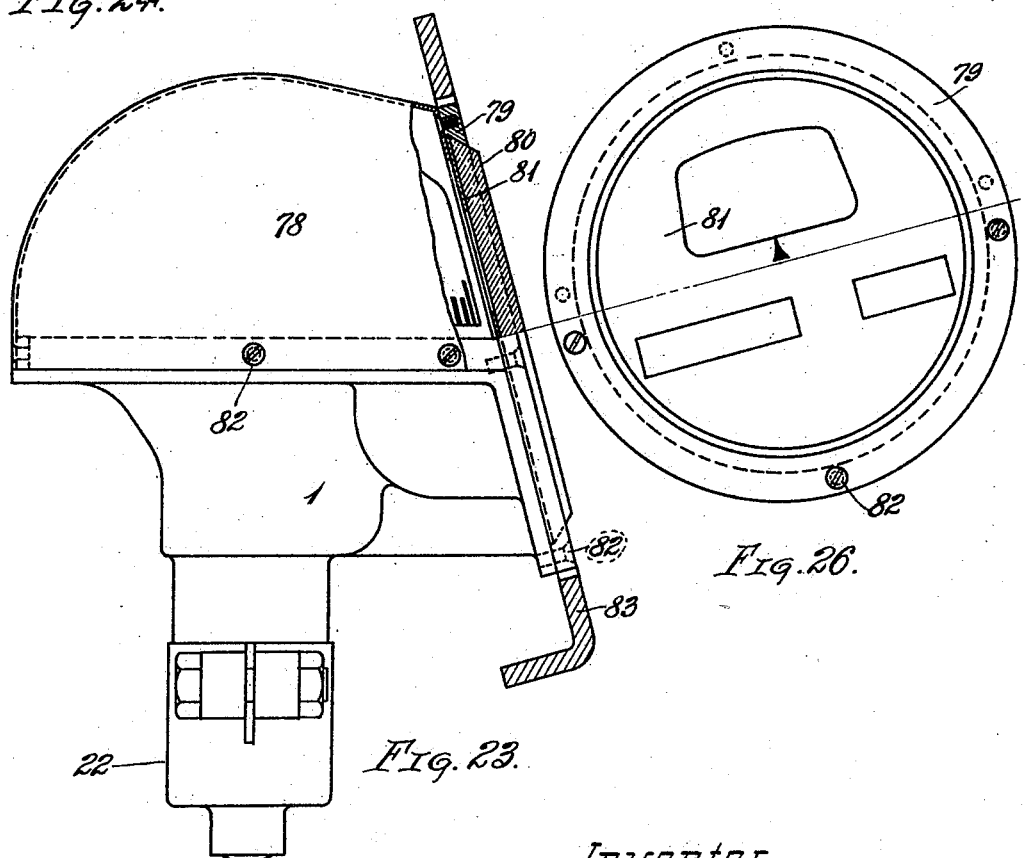

E. J. WILSON.
ROTARY SPEED INDICATOR.
APPLICATION FILED JUNE 24, 1918.

1,416,084.

Patented May 16, 1922.
6 SHEETS—SHEET 6.

Inventor
Emery J. Wilson

By Barthel & Barthel
Attorneys

UNITED STATES PATENT OFFICE.

EMERY J. WILSON, OF CLEVELAND, OHIO.

ROTARY SPEED INDICATOR.

1,416,084.  Specification of Letters Patent.  Patented May 16, 1922.

Application filed June 24, 1918. Serial No. 241,720.

*To all whom it may concern:*

Be it known that I, EMERY J. WILSON, a citizen of the United States, residing at Cleveland, in the county of Cuyahoga and State of Ohio, have invented certain new and useful Improvements in Rotary Speed Indicators, of which the following is a specification.

This invention relates to speed indicators of the liquid centrifugal type. The invention is an improvement upon the construction described and claimed in my prior applications for rotary speed indicator, Serial Numbers 138,212, filed December 21, 1916, and 171,725, filed May 29, 1917.

The basic features of the present invention and the earlier inventions disclosed in the said applications are founded on the fact that it is possible, in instruments employing a liquid mass subjected to centrifugal action, to produce forced positions of equilibrium of the liquid mass instead of the natural positions of equilibrium of such mass in presence of variations in speed of rotation. Under centrifugal action the shift of the vertex of the parabola is generally through distances which are not directly proportional to the speed of rotation, there being one exception to this general rule or law, this exception being that where the outer limit of the free surface of the vortex traverses a horizontal face which forms the upper confining wall of the container, the shift provided by the change in vortex contour and which retains the limits of the vortex active in connection with such horizontal surface, the distances through which the vertex shifts are directly proportional to the speed of rotation. This is more particularly pointed out in connection with the application Serial No. 138,212. Structures employing a horizontal surface of this type, however, can only be utilized under conditions where the liquid mass is more or less transparent as is the container, and under conditions where the vortex set up presents an unbroken surface; if the surface be broken, the action changes to that of the general law. This renders such excepted structures practically useless for purposes such as contemplated by the present application.

In the inventions of these several applications the liquid mass is operative within inner and outer chambers spaced apart and in constant communication through the body of the mass, each chamber having free liquid surfaces which traverse a wall or walls of the chambers, these surfaces being connected through the body of the mass. The free liquid surface of the inner chamber serves as the surface operative to produce the indications of the instrument, this surface approximating generally the vertex of the parabola. Since the fundamental feature of the inventions is to provide an instrument in which the indications are spaced in substantial uniformity as to distance, it will be understood that under the laws of centrifugal force which set up the natural positions of equilibrium of the mass rotation of the instrument would produce shift of this indicating or index surface through unequal distances for equal increments of speed of rotation, thus providing for non-uniform spacing of the indications of the instrument. I have found that it is possible to produce a face or faces which is traversed by one or the other free liquid surface and which will serve to set up the conditions of forced positions of equilibrium of the mass at definite speeds of rotation, and that such face—which may be termed a compensating face—can be formed in such manner that the distances traversed by the index or indicating free surface will be equal for equal increments of speed. A face of this kind can be mathematically derived and for this reason may be termed a calibration surface.

In the application Serial No. 138,212, this compensating face forms a wall of the inner chamber, while in the application Serial No. 171,725, the compensating face forms a wall of the outer chamber, the present invention being more particularly of the latter type, utilizing the same compensating face as is disclosed in the said application Serial No. 171,725.

The present invention, in its fundamentals, differs mainly from the invention disclosed in application Serial No. 171,725, in the method of providing the uniform spacing of indications in that part of the instrument operation referred to as the "initial speeds" of the earlier application, the latter producing this result by the use of a spiral thread of proper configuration. In the present invention this general result is obtained by the use of a second compensating face located to be effective within this "initial speed" zone of the earlier application, thus materially reducing such "initial speed" zone. This second compensating face is not effective throughout this "initial speed" zone of the earlier application, and hence the remainder of such zone may be corrected by the specific spiral formation used in connection with the earlier application, but, since the speeds represented by this remaining "initial speed" zone are such as need not be taken into consideration in instruments used for the purpose designed, and represents but a small portion of the indication-reading element, this remaining portion as shown herein, may have non-uniform spacing.

As in the application Serial No. 171,725, the compensating face is located opposite a face of selected geometrical design, the free surface traversing both faces concurrently, thus setting up what may be termed a zone of compensation. In the present invention this condition applies in connection with both compensating faces, so that there is provided a succession of zones of compensation, the respective faces of selected geometrical design in the two zones, however, having a different geometrical relation to the axis of rotation, one of the faces extending in a direction generally perpendicular to the axis of rotation, the geometrical face of the other zone extending in substantial parallelism with such axis.

Another of the objects of the invention is to improve the form of the discharge chamber into which the liquid flows as the speed increases in such manner as to produce accurate registeration of the speed during the lower speeds of rotation, and to render possible the use of a scale graduated uniformly substantially down to the zero speed.

Another object of the invention is to improve the construction of the traveling float and its operating connection to the indicating scale, so as to insure more accurate representation by the scale of the true speed and to avoid any cramping of the parts such as might affect the position of the scale and introduce error into the indication.

A further object of the invention is to provide for removing the scale from the influence of air currents and air friction produced by the rapidly revolving liquid holding receptacle.

A further object of the invention is to improve the general construction of the device so as to adapt it for application to inclined instrument boards, to enable the operator to easily obtain access to interior parts for lubrication, repair or replacement, and to enable the operating shaft to be connected in different ways to the instrument.

A further object of the invention is to provide means for avoiding any error in accuracy which might otherwise be produced by inclination to the vertical of the normal axis of the device.

Further objects of the invention are in part obvious and in part will appear more in detail hereinafter.

The invention comprises the construction and arrangement of parts hereinafter described and claimed.

Figure 20:
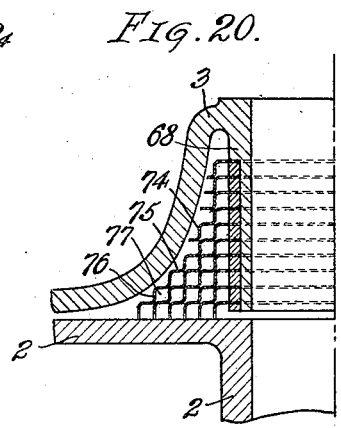
Figure 21:
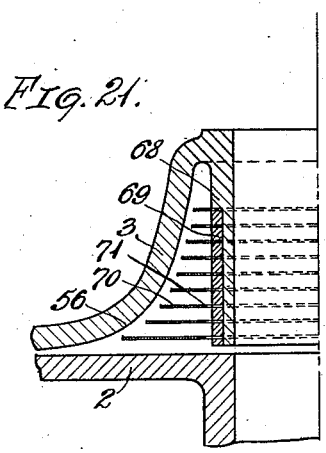
Figure 22:
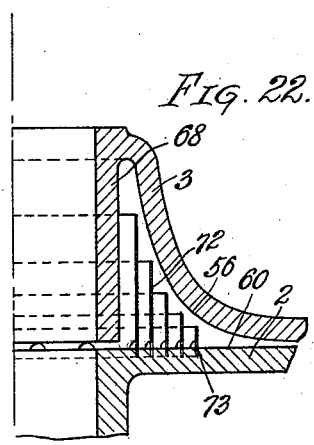
Figure 27:
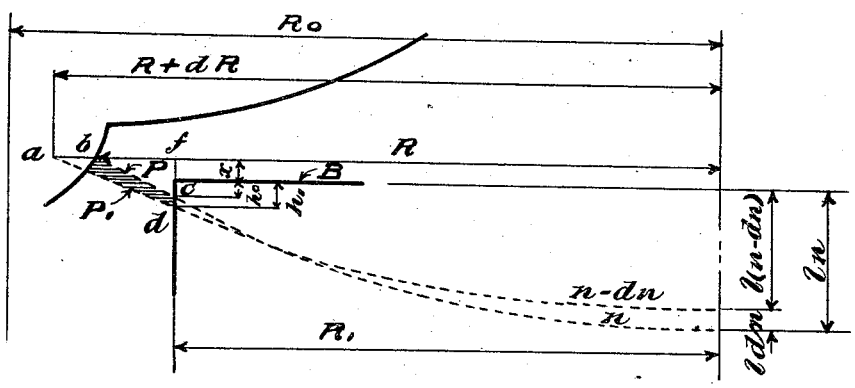
Figure 28:
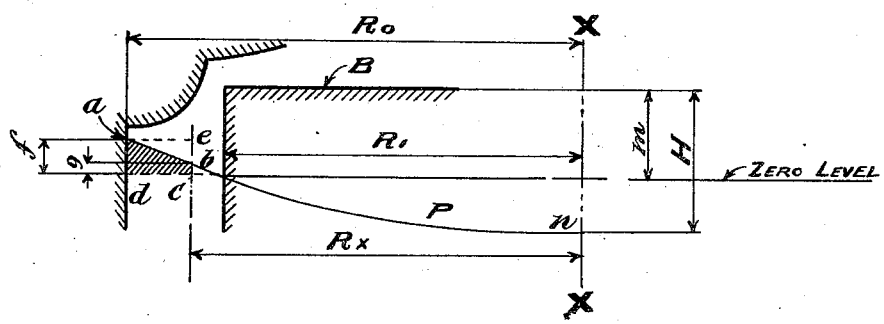

In the drawings, Fig. 1 is a front elevation of the assembled indicator; Fig. 2 is a sectional elevation on the line 2—2, Fig. 1, looking in the direction of the arrows; Fig. 3 is a sectional elevation on the line 3—3, Fig. 2, looking in the direction of the arrows; Figs. 4, 5, and 6 are sectional plan views on the lines 4—4, 5—5, and 6—6, Fig. 2; Fig. 7 is a plan view of the upper frame member; Fig. 8 is a sectional elevation on the line 8—8, Fig. 7; Figs. 9 and 10 are respectively front and side elevations of the assembled spindle and guide; Figs. 11, 12 and 13 are respectively a front elevation, a side elevation, and a plan view of the float; Fig. 14 is a detail sectional elevation, illustrating a modified form of driving mechanism; Fig. 15 is a side elevation thereof; Fig. 16 is a diagrammatic view, on a larger scale, in section through the discharge chamber shown in Fig. 3; Fig. 17 is a partial developed view of the graduated scale; Fig. 18 is a diagram similar to Fig. 16, and illustrating modified forms of calibration surfaces; Fig. 19 is a diagrammatic view illustrating in both plan and elevation the action of the liquid when the axis of the device is inclined to the vertical; Fig. 20 is a detail sectional elevation illustrating one form of means for avoiding error due to inclination of the axis of the device; Figs. 21 and 22 are similar views illustrating other arrangements for the same purpose; Fig. 23 is a side elevation illustrating a modified form of the device with a part of the removable cover shown in section; Fig. 24 is a plan view of the cover; Fig. 25 is a front elevation of the top casing; Fig. 26 is a front view of the instrument face and Figs. 27 and 28 are diagrammatic views used in the derivation of the mathematical formulæ for the additional compensating face and for the initial speeds respectively.

In the drawings 1 indicates the frame of the instrument which supports a rotating unit including a body 2 and tight fitting cap 3 therefor. These parts rotate, as will hereafter appear. Within the body 2 is a stationary tubular member 4, held fixed at its upper end in the dome 5 by nuts 6 and 7. This tube serves as a journal for the cap and extends downwardly through the body so as to form therein a fixed axial chamber 9 about which the entire liquid holding receptacle is free to rotate. The lower end of tube 4 is provided with a plug 10 supporting a bridge 11 which has passages 12 uniting the axial chamber 9 with a central hole 13 in the bottom of the plug.

Between the cap 3 and body 2 is a discharge chamber 14, the outer portion of which communicates with the hole 13 by way of inclined passages 15 and a clearance space 16 surrounding the lower part of the tube 4, so that there is constant liquid communication between the lower end of the axial chamber 9 and discharge chamber 14. A hole 16$^a$ in tube 4 unites the discharge chamber 14 with the upper end of the axial chamber 9 so that the confined air is free to pass from one to the other of said chambers.

The lower end of body 2 is preferably provided with a cap 17 having an extension forming step and journal bearings at 18 and 19 with the frame 1, said extension carrying a cross pin 20 and sleeve 21 at its lower end for rotating the receptacle. The driving means is connected to sleeve 21 and may be of any suitable form such, for example, as the usual flexible shaft (not shown).

Fig. 14 illustrates a modification enabling the instrument to be coupled to a flexible shaft which comes in at an angle to the instrument instead of in alignment with its axis, as in Fig. 2. In this arrangement the split swivel socket 22 is clamped tightly to the lower end of the frame member 1 by a clamping bolt 23 passing through the clamping ears 24. Said socket carries a removable plug 25 which serves as a bearing for the inclined shaft 26 to which the flexible driving shaft is connected in the same manner as in Fig. 2. An extension of the cap 17$^a$ carried by the body 2 is provided with a conical end thrust bearing 27 in an adjusting screw 28 and carries the bevel gear 29 which meshes with and is driven by the bevel gear 30 on shaft 26. By appropriately forming the lower end of frame member 1 and cap 17 or 17$^a$ the instrument can therefore be readily adapted for drive from a driving shaft coming in at practically any angle or from any direction.

The lower end of the frame 1 or the projecting end of the plug 25, as the case may be, is provided with screw threads 31 for attaching thereto the coupling of the flexible driving shaft, as is usual in automobile practice.

Body 2 is also preferably provided with a screw thread 32 which serves as a worm for driving the distance recording number wheels 33. Since this distance recording mechanism is of common form and forms no part of the present invention, further description thereof is unnecessary.

34 indicates the instrument dial, which is of hollow inverted dish form surrounding the dome 5 and carried by the central spindle 35, to which it may be secured by a nut 36. The skirt 37 of the dial preferably flares downwardly, so that the visible portion thereof is inclined when the axis of the instrument is vertical and hence will lie substantially normal to the line of sight from an observer located above the instrument, as is usually the case in automobile practice.

Spindle 35 carrying the dial is held in a yoke 38 (Fig. 9) which unites the upper ends of the arms of a U-shaped guide 39. Said spindle has a bearing in a plug 40 fitting tightly in the upper end of the stationary tube 4, while the lower end of the guide 39 has a small pivot pin 41 centered in the bridge 11, so that the net weight of the guide, spindle and dial is supported on pivot pin 41.

Within the tube 4 is a cylindrical float 42 adapted to move freely up and down in said tube with the rise and fall of the liquid therein. Said float is provided with outwardly extending pins 43 entering helical grooves 44 in the inner wall of the stationary tube 4. The float is further provided with vertically extending slots 45 (Fig. 13) to receive the parallel bars or arms of the guide 39 along which the float slides. The arrangement is such that as the float moves up and down in the tube with the liquid the guide 39, spindle 35 and dial 34 are rotated through an angle proportional to the vertical movement of the float.

By utilizing a two armed guide 39 whose arms engage slots in the periphery of the float, the bearing of the float on the guide is placed further away from the central axis than in the indicator shown in my prior applications referred to, where the guide is a square rod passing through a central hole in the float. In Fig. 9 the bearing of the float on the guide is at a distance R from the central axis, whereas in the prior construction the bearing is at a lesser distance $r$ from the central axis. Consequently, in the present form of device, both the sliding friction at this bearing (due to the resistance which the parts offer to rotation) and the lost motion at the periphery of the scale (due to lost motion at this bearing) are $\frac{r}{R}$ times smaller than in the device of my prior applications referred to, thereby improving the accuracy of the indication.

Dial 34 is graduated upon its outer conical skirt 37, the numbers 46 thereon usually indicating miles per hour, as is customary in automobile practice. This scale is visible through an opening 47 in the face plate 48, thereby exposing to view the numbers and divisions marked on the scale for co-operation with the fixed index point 49.

The upper parts of the device are preferably inclosed in a suitable casing 50 having a removable glass face 51 held in place by a bezel 52 and keeper ring 53. The dome shaped cover 5 carried by the frame 1 lies between the rotating cap 3 and dial 34. Consequently, it eliminates the effect upon the dial of air currents and air friction caused by the rapidly rotating receptacle, and which air effect would tend to rotate the dial and therefore cause undue friction of the float pins in the grooves and of the float on the guide.

The operation is as follows:

When the receptacle is at rest the axial chamber 9, clearance space 16, inclined passages 15 and discharge chamber 14 are filled with mercury to the predetermined level represented by the section line 6—6, Fig. 2. Float 42 is at its highest or initial position and the zero on the scale is opposite the index pointer, as shown in Fig. 1. When the receptacle is rotated at a given speed the mercury in the axial chamber descends a certain distance H (Fig. 3), thereby permitting the float to fall to the position shown in dotted lines. At the same time the float is rotated through a definite angle by the travel of its pins in the helical grooves, which rotation is communicated to the dial so as to indicate in miles per hour the amount of rotation on the scale at the index point. The mercury flows from chamber 9 into the discharge chamber 14, where its free surface assumes a new position of equilibrium, as indicated at 54, due to the combined action of centrifugal force and gravity. The free surface of the mercury in this new position is a part of the parabolic vortex which, continued, as indicated at 55, intersects the central axis at the level of the mercury in the central chamber 9. It is to be noted that since the mercury in the central chamber 9 does not rotate, its top free surface does not follow this parabolic vortex surface, but remains a plane surface tangent thereto. The laws governing this action are known and definite, and it is possible therefrom to determine mathematically the exact form of calibration surfaces 56 and 57 in chamber 14 which will cause the axial mercury column to move through distances directly proportional to the speed of rotation.

In my prior application, Serial Number 171,725, I explained the derivation of the calibration surface 56 of the discharge chamber 14 and pointed out that for speeds below its limited range of action a uniformly graduated scale does not give correct readings unless the groove in the central tube 4 has a variable pitch. In the present invention I have provided means for securing accuracy in the lower ranges of speed of rotation, while still retaining the use of a spiral of uniform pitch. Referring to Figs. 16 and 17, as the speed is increased from zero to a point marked $N_1$ on the scale the mercury surface in the discharge chamber moves from the zero position $n_0$ to the position $n_1$, its outer edge traveling up the outer cylinder surface 58. Over this range of speed the scale spacing is not uniform, although it is perfectly definite and calculable. As the speed increases from $N_1$ to $N_2$ on the scale the mercury surface moves from $n_1$ to $n_2$, its outer edge traveling along the calibration surface 57, while its inner edge works up the inner cylindrical surface 59. As the speed increases from $N_2$ to sixty miles per hour on the scale the mercury surface moves from $n_2$ to $n_3$, its upper edge traveling along the calibration surface 56, while its lower edge moves along the plane surface 60. Over these ranges, from $n_1$ to $n_3$ the scale spacing is uniform.

The derivation of curve 57 is similar to that described in my prior application for the curve 56, except that the assumed base surface is taken as the cylindrical surface 59 concentric with the axis of rotation, whereas the assumed base surface for the curve 56 is taken as the plane surface 60 perpendicular to said axis.

As heretofore pointed out, the face indicated at 56 in Figure 16 is similar in characteristic to the compensating face disclosed in application Serial No. 171,725, the formulæ and the derivations employed in producing this face being set forth in detail in the said application; it is therefore unnecessary to repeat the same herein. Like in said earlier application, the faces 56 and 60 form walls which set up a zone of compensation within the outer chamber having as its general limits the lines indicated as $n_2$ and $n_3$ in Fig. 16. The formulæ and mathematical derivations representing the travel of the free surface from position $n_0$ to $n_2$ in Figure 16 will now be described, Figures 27 and 28 being views which illustrate the several calculations, Figure 27 being illustrative of the compensating face which controls the travel between the position $n_1$ and $n_2$ of the free liquid surface, Figure 28 illustrating the derivations for the initial speeds representing the travel of the free liquid surface from position $n_0$ to position $n_1$.

In these derivations certain values are assumed or known, and the following table shows which proportions are assumed or are known constants, and which of the variables depend upon the speed of rotation and these constants:

CONSTANTS.

The lower confining wall B of the discharge chamber is a plane surface perpendicular to the axis of rotation. The zero level of the liquid is at a distance $m$ below the surface B.

*Given basic proportions.*

$l$ = uniform movement of float for one R. P. M. change of speed.
$\rho$ = radius of net area of central column.
$R_o$ = outer radius of annular portion of discharge chamber.

*Derived constants.*

$c = .0000142$ (source found in application Ser. No. 138,212).
$m$ = distance from base surface to zero level.
$R_1$ = inner radius of annular portion of discharge chamber.
$n_1$ = speed at which uniform movement of float starts.
$n_2$ = speed corresponding to lower limit of compensating face 56 and upper limit of compensating face or calibration curve indicated at 57.

VARIABLES.

$n$ = R. P. M.
$H$ = displacement of float from base line B.
$R$ = horizontal coordinate of calibration curves.
$x$ = vertical coordinate of calibration curves.

*General formulæ.*

The following general formulæ are employed in plotting the two compensating faces or calibration curves indicated as 56 and 57 in Fig. 16, and for determining the position of the float at all speeds:

*For calibration curve of face 56.*

$$R^2 = \frac{\sqrt{4c l \rho^2 n + l^2} + l}{2cn}$$

$x = cR^2 n^2 - ln$ $H = ln$

Limit: $-n_2 = \dfrac{l}{cR_1^2}$

*For calibration curve of face 57.*

$$R^2 = \frac{\sqrt{(2cR_1^2 n - l)^2 + 4c l \rho^2 n} + l}{2cn}$$

$x = cR^2 n^2 - ln$ $H = ln$

Limits: $-n_2 = \dfrac{l}{cR_1^2}$ and $n_1 = \dfrac{l}{2cR_1^2}$

*For initial speeds.*

$H = cR_1^2 n^2 + m$

Limit: $-n_1 = \dfrac{l}{2cR_1^2}$

The methods for deriving these formulæ are set forth more particularly in connection with application Serial No. 171,725, and the mathematical calculations for obtaining the formulæ of the calibration curve of face 56 are also set forth in the said application.

The derivations of the formula for the calibration curve of face 57 and for the initial speeds are as follows:

*Derivation of curve of face 57* (Fig. 27).

$dV = V abcd = V afd - V bfc = \pi \rho^2 l \, dn$ as $dn$ approaches 0.

$$V afd = \frac{\pi}{2}\left\{(R+dR)^2[l(n-dn)+x] - R_1^2[l(n-dn)-h_1]\right\} - \pi R_1^2(x+h_1)$$

$$V bfc = \frac{\pi}{2}\left\{R^2(ln+x) - R_1^2(ln-h_o)\right\} - \pi R_1^2(x+h_o)$$

$$\frac{\pi}{2}\left\{(R+dR)^2[l(n-dn)+x] - R_1^2[l(n-dn)-h_1] - R^2(ln+x) + R_1^2(ln-h_o)\right\} - \pi R_1^2(x+h_1-x-h_o)$$
$$= \pi \rho^2 l \, dn$$

$$(R+dR)^2[l(n-dn)+x] - R_1^2[l(n-dn)-h_1] - R^2(ln+x) + R_1^2(ln-h_o) - 2R_1^2(h_1-h_o) = 2\rho^2 l \, dn \quad \text{(I)}$$

From the general equation of the parabolic vortex $cR^2 n^2 = H$ we have:—

(1) $c(R+dR)^2(n-dn)^2 = l(n-dn)+x$     $h_1 = l(n-dn) - cR_1^2(n-dn)^2$ ........ from (3)

(2) $cR^2 n^2 = ln + x$     $h_o = ln - cR_1^2 n^2$ ........................... from (4)

(3) $cR_1^2(n-dn)^2 = l(n-dn) - h_1$     $h_1 - h_o = cR_1^2[n^2 - n^2 + 2n \, dn - dn^2] - l \, dn$ (4) $cR_1^2 n^2 = ln - h_o$                 $= [cR_1^2(2n - dn) - l] dn$

Substituting in (I)

$$(R+dR)^2 c(R+dR)^2(n-dn)^2 - R_1^2 cR_1^2(n-dn)^2 - R^2 cR^2 n^2 + R_1^2 cR_1^2 n^2$$
$$- 2R_1^2[cR_1^2(2n-dn) - l] dn = 2\rho^2 l \, dn$$

$$\{c(R+dR)^4(n-dn)^2 - cR^4 n^2\} + cR_1^4[n^2 - (n-dn)^2] - 2R_1^2[cR_1^2(2n-dn) - l] dn = 2\rho^2 l \, dn \quad \text{(II)}$$

From (1) and (2):—

$$c(R+dR)^2(n-dn)^2 = (ln+x) - ldn = cR^2n^2 - ldn$$

$$(R+dR)^2 = \frac{cR^2n^2 - ldn}{c(n-dn)^2} \quad \therefore (R+dR)^4 = \frac{(cR^2n^2 - ldn)^2}{c^2(n-dn)^4}$$

$$\therefore c(R+dR)^4(n-dn)^2 - cR^4n^2 = \frac{c(cR^2n^2 - ldn)^2}{c^2(n-dn)^4}(n-dn)^2 - cR^4n^2$$

$$= \frac{(cR^2n^2 - ldn)^2 - c^2R^4n^2(n-dn)^2}{c(n-dn)^2}$$

$$= \frac{c^2R^4n^4 - 2clR^2n^2dn + l^2dn^2 - c^2R^4n^4 + 2c^2R^4n^3dn - c^2R^4n^2dn^2}{c(n-dn)^2}$$

$$= \frac{(l^2 - c^2R^4n^2)dn^2 + 2cR^2n^2(cR^2n - l)dn}{c(n-dn)^2}$$

Substituting in (II):—

$$\frac{(l^2 - c^2R^4n^2)dn^2 + 2cR^2n^2(cR^2n - l)dn}{c(n-dn)^2} + cR_1^4(2n-dn)dn - 2R_1^2[cR_1^2(2n-dn) - l]dn = 2\rho^2 l dn$$

$$\frac{(l^2 - c^2R^4n^2)dn + 2cR^2n^2(cR^2n - l)}{c(n-dn)^2} + cR_1^4(2n-dn) - 2R_1^2[cR_1^2(2n-dn) - l] = 2\rho^2 l$$

At limit $dn = 0$. Hence:—

$$\frac{2cR^2n^2(cR^2n - l)}{cn^2} + 2cnR_1^4 - 4cnR_1^4 + 2R_1^2 l = 2\rho^2 l$$

$$2cR^4n - 2R^2 l - 2cnR_1^4 + 2R_1^2 l = 2\rho^2 l$$

$$cR^4n - lR^2 = cnR_1^4 - (R_1^2 - \rho^2)l$$

$$R^4 - \frac{l}{cn}R^2 + \left(\frac{l}{2cn}\right)^2 = R_1^4 - \frac{(R_1^2 - \rho^2)l}{cn} + \frac{l^2}{4c^2n^2}$$

$$\left(R^2 - \frac{l}{2cn}\right)^2 = \frac{4c^2n^2R_1^4 - 4cnR_1^2 l + 4cn\rho^2 l + l^2}{4c^2n^2} = \frac{(2cnR_1^2 - l)^2 + 4cn\rho^2 l}{4c^2n^2}$$

$$R^2 - \frac{l}{2cn} = \frac{\sqrt{(2cR_1^2 n - l)^2 + 4cl\rho^2 n}}{2cn}$$

$$R^2 = \frac{\sqrt{(2cR_1^2 n - l)^2 + 4cl\rho^2 n} + l}{2cn} \quad \text{(III)}$$

From (2)
$$x = cR^2n^2 - ln \quad \text{(IV)}$$

When $R = R_0$, $n = n_1$

From (III)

$$(2cn_1 R_0^2 - l)^2 = (2cR_1^2 n_1 - l)^2 + 4cl\rho^2 n_1$$

$$4c^2 n_1^2 R_0^4 - 4cl R_0^2 n_1 + l^2 = 4c^2 R_1^4 n_1^2 - 4cl R_1^2 n_1 + l^2 + 4cl\rho^2 n_1$$

$$4c^2(R_0^4 - R_1^4)n_1^2 = 4cln_1(R_0^2 - R_1^2 + \rho^2)$$

$$n_1 = \frac{(R_0^2 - R_1^2 + \rho^2)l}{c(R_0^4 - R_1^4)} \quad \text{(V)}$$

To find the value of $R_1$ which gives $n_1$ minimum, we have:—

$$\frac{dn_1}{dR_1} = \frac{d}{dR_1}\left[\frac{(R_0^2 - R_1^2 + \rho^2)l}{c(R_0^4 - R_1^4)}\right] = 0$$

$$\frac{c(R_0^4 - R_1^4)(-2R_1 l) - (R_0^2 - R_1^2 + \rho^2)l(-4cR_1^3)}{c^2(R_0^4 - R_1^4)^2} = 0$$

$$2R_1 lc(R_0^4 - R_1^4) = 4clR_1^3(R_0^2 - R_1^2 + \rho^2) \qquad R_0^4 - R_1^4 = 2R_1^2 R_0^2 - 2R_1^4 + 2R_1^2 \rho^2$$

$$R_1^4 - 2(R_0^2 + \rho^2)R_1^2 + (R_0^2 + \rho^2)^2 = -R_0^4 + (R_0^4 + 2R_0^2\rho^2 + \rho^4) = \rho^2(2R_0^2 + \rho^2)$$

$$R_1^2 - (R_0^2 + \rho^2) = \rho\sqrt{2R_0^2 + \rho^2}$$

$$R_1^2 = R_0^2 + \rho^2 - \rho\sqrt{2R_0^2 + \rho^2} \quad \text{(VI)}$$

From (V) and (VI):—

$$n_1 = \frac{[R_o^2 - (R_o^2 + \rho^2 - \rho\sqrt{2R_o^2 + \rho^2}) + \rho^2]l}{c\{R_o^4 - [R_o^4 + 2R_o^2\rho^2 + \rho^4 - 2(R_o^2 + \rho^2)\rho\sqrt{2R_o^2 + \rho^2} + \rho^2(2R_o^2 + \rho^2)]\}}$$

$$= \frac{\rho l\sqrt{2R_o^2 + \rho^2}}{c[-4R_o^2\rho^2 - 2\rho^4 + 2(R_o^2 + \rho^2)\rho\sqrt{2R_o^2 + \rho^2}}$$

$$= \frac{\rho l\sqrt{2R_o^2 + \rho^2}}{2c[(R_o^2 + \rho^2)\rho\sqrt{2R_o^2 + \rho^2} - (2R_o^2 + \rho^2)\rho^2}$$

$$= \frac{l}{2c(R_o^2 + \rho^2 - \rho\sqrt{2R_o^2 + \rho^2})} = \frac{l}{2cR_1^2} \quad \text{(VII)}$$

*Derivation of formulæ for initial speeds* (Fig. 28).

$Vabcd$ = volume of mercury added to discharge chamber.

$\pi\rho^2(H-m)$ = volume of mercury taken from center chamber.

$\therefore Vabcd = Vaecd - Vaeb = \pi\rho^2(H-m)$ $$= \pi(R_o^2 - R_x^2)f - \left\{\frac{\pi}{2}[R_o^2(H-m+f) - R_x^2(H-m+g)] - \pi R_x^2(f-g)\right\} = \pi\rho^2(H-m)$$

$$\pi R_o^2 f - \pi R_x^2 f - \frac{\pi}{2}[R_o^2(H-m+f) - R_x^2(H-m+g)] + \pi R_x^2 f - \pi R_x^2 g = \pi\rho^2(H-m)$$

$$2R_o^2 f - 2R_x^2 g - R_o^2(H-m+f) + R_x^2(H-m+g) = 2\rho^2(H-m) \quad \text{(I)}$$

But:—

$$cR_o^2 n^2 = H - m + f \quad f = cR_o^2 n^2 - (H-m)$$

$$cR_x^2 n^2 = H - m + g \quad g = cR_x^2 n^2 - (H-m)$$

$$2R_o^2[cR_o^2 n^2 - (H-m)] - 2R_x^2[cR_x^2 n^2 - (H-m)] - R_o^2 cR_o^2 n^2 + R_x^2 cR_x^2 n^2 = 2\rho^2(H-m)$$

$$2cR_o^4 n^2 - 2R_o^2(H-m) - 2cR_x^4 n^2 + 2R_x^2(H-m) - cR_o^4 n^2 + cR_x^4 n^2 = 2\rho^2(H-m)$$

$$(2R_o^2 - 2R_x^2 + 2\rho^2)(H-m) = (R_o^4 - R_x^4)cn^2$$

$$H - m = \frac{(R_o^4 - R_x^4)}{2(R_o^2 - R_x^2 + \rho^2)} cn^2 \quad \text{(II)}$$

The parabola P, for all values of $n$, intersects the zero level at a constant distance $R_1$ from X—X since $$cn^2 R_1^2 = H - m = \frac{(R_o^4 - R_x^4)cn^2}{2(R_o^2 - R_x^2 + \rho^2)} \therefore R_1^2 = \frac{(R_o^4 - R_x^4)cn^2}{2(R_o^2 - R_x^2 + \rho^2)cn^2} = \frac{R_o^4 - R_x^4}{2(R_o^2 - R_x^2 + \rho^2)} = \text{constant.}$$

Since equation (II) is true for all values of $R_x$, when $R_x = R_1$ we have $$R_1^2 = \frac{R_o^4 - R_1^4}{2(R_o^2 - R_1^2 + \rho^2)} \quad \therefore 2R_o^2 R_1^2 - 2R_1^4 + 2R_1^2\rho^2 = R_o^4 - R_1^4$$

$$R_1^4 - 2(R_o^2 + \rho^2)R_1^2 = -R_o^4$$

$$R_1^4 - 2(R_o^2 + \rho^2)R_1^2 + (R_o^2 + \rho^2)^2 = R_o^4 + 2R_o^2\rho^2 + \rho^4 - R_o^4$$

$$R_1^2 - (R_o^2 + \rho^2) = \pm\rho\sqrt{2R_o^2 + \rho^2}$$

$$R_1^2 = R_o^2 + \rho^2 - \rho\sqrt{2R_o^2 + \rho^2} \quad \text{(III)}$$

This value of $R_1$ is the same as the value of $R_1$ determined in the derivation of curve of face 57; see equation (VI) above.

Hence, from (II) and (III):—

$$H - m = \frac{R_o^4 - [R_o^4 + 2R_o^2\rho^2 + \rho^4 - 2(R_o^2 + \rho^2)\rho\sqrt{2R_o^2 + \rho^2} + \rho^2(2R_o^2 + \rho^2)]}{2[R_o^2 - (R_o^2 + \rho^2 - \rho\sqrt{2R_o^2 + \rho^2}) + \rho^2]} cn^2$$

$$= \frac{-4R_o^2\rho^2 - 2\rho^4 + 2(R_o^2 + \rho^2)\rho\sqrt{2R_o^2 + \rho^2}}{2\rho\sqrt{2R_o^2 + \rho^2}} cn^2 = \frac{2(R_o^2 + \rho^2)\rho\sqrt{2R_o^2 + \rho^2} - 2\rho^2(2R_o^2 + \rho^2)}{2\rho\sqrt{2R_o^2 + \rho^2}} cn^2$$

$$= (R_o^2 + \rho^2 - \rho\sqrt{2R_o^2 + \rho^2})cn^2$$

$$H = (R_o^2 + \rho^2 - \rho\sqrt{2R_o^2 + \rho^2})cn^2 + m = cR_1^2 n^2 + m \quad \text{(IV)}$$

Value of m.

When
$$n = n_1 \quad H = ln_1$$
$$\therefore ln_1 = cR_1^2 n_1^2 + m$$
$$m = ln_1 - cR_1^2 n_1^2$$

From equation (VII) of curve of face 57 above $n_1 = \dfrac{l}{2cR_1^2}$

Hence
$$m = l\frac{l}{2cR_1^2} - cR_1^2 \frac{l^2}{4c^2R_1^4} = \frac{l^2}{2cR_1^2} - \frac{l^2}{4cR_1^2} = \frac{l^2}{4cR_1^2} \quad\quad\quad\quad (V)$$

Or, since
$$n_1 = \frac{l}{2cR_1^2} \quad cR_1^2 = \frac{l}{2n_1}$$
$$\therefore m = ln_1 - \frac{l}{2n_1} \cdot n_1^2 = ln_1 - \frac{ln_1}{2} = \frac{ln_1}{2} \quad\quad\quad\quad (VI)$$

Value of $n_2$.

From equation (III) of curve of face 56 found in application Ser. No. 171,725, and equation (III) of curve of face 57 above $$\frac{\sqrt{4cl\rho^2 n_2 + l^2} + l}{2cn_2} = \frac{\sqrt{(2cR_1^2 n_2 - l)^2 + 4cl\rho^2 n_2} + l}{2cn_2}$$

$$4cl\rho^2 n_2 + l^2 = 4c^2 R_1^4 n_2^2 - 4clR_1^2 n_2 + l^2 + 4cl\rho^2 n_2$$

$$4c^2 R_1^4 n_2^2 = 4clR_1^2 n_2$$

$$n_2 = \frac{l}{cR_1^2} = 2n_1 \quad\quad\quad\quad (VII)$$

Fig. 18 shows still other modified forms for these two calibration surfaces. For the curve 61 the assumed base surface is taken as a definite obtuse cone 62, whose surface extends substantially horizontally and whose apex is in the axis of rotation. For the curve 63, which is the calibration surface, the assumed base surface is taken as the outer cylindrical surface 64.

In every case the curves of the calibration surfaces 56, 57, 61 and 63 or any other calibration surfaces, are derived by equating the increment of mercury volume flowing into the discharge chamber to the predetedmined amount of mercury flowing from the axial chamber 9, and these curves are definable by a mathematical equation expressing the exact relation between their variable coordinates R and $x$, with reference to the axes OX, OY, and constants depending upon the assumed proportions of the instrument. It is evident that various forms of calibration surfaces can be utilized by assuming different forms for, and different locations of, the base surfaces.

No mathematical calculations are indicated herein for the changed form shown in Figure 18, it being readily understood that the general principles shown in the derivations of application Serial No. 171,725 and those above pointed out, apply in connection with this changed form, such modifications as may be necessary being readily understood in view of the explanation above presented.

From the above it will be readily understood that the present application presents a speed indicator wherein a confined liquid mass is subjected to centrifugal action to produce characteristics of a vortex, wherein the carrier for the liquid mass is formed to provide inner and outer chambers in permanent communication and with each chamber having a free liquid surface of the mass, the free surfaces being in permanent connection through the body of the mass, and wherein the indications are made responsive to the changes in position of the free liquid surface of the mass of the inner chamber, such indicator having means operative to establish definite positions of equilibrium of the mass at definite speeds of rotation in presence of mass increment flow produced by variations in speed, said means including a succession of faces of the outer chamber positioned to be traversed successively by the free liquid surface operating in such chamber, each face having a cross-sectional contour of mathematically-derived characteristic such as to cause the volumetric displacement represented by the movement of the free liquid surface of the outer chamber in traversing said faces during movement from one position of mass equilibrium to another to be equal for equal increments of speed.

It will also be understood that I have provided an instrument of this kind in which a succession of communicating zones of compensation are located within the path of travel of the free liquid surface of the outer chamber, each zone being operative to produce positions of liquid mass equilibrium wherein equal increments of speed provide equal increments of the mass displaced within the chambers, these zones of compensation being located with respect to each other in such way as to become active in immediate succession as the free liquid surface passes from one zone to the other, one zone becoming inactive for compensating purposes when the other zone becomes active, the two zones not being active for compensating purposes concurrently. This will be understood from the fact that when the free liquid surfaces passes into the zone of activity of face 56 in Fig. 16, the face 57 forms a wall of a cavity which is filled and the cavity content thus becomes temporarily a part of the mass which connects the free liquid surface of the outer chamber with the free liquid surface of the inner chamber, face 57 thus becoming inactive, being rendered active when the free surface passes the point $n^2$ during the movement of such free surface from the zone of face 56 toward the position of rest of the mass.

As will be understood, the faces of the two zones which oppose the compensating faces 56 and 57 are of selected geometrical design, and in the particular form shown differ in the geometrical relation to the axis of rotation, face 60 extending substantially perpendicular to the axis of rotation, while face 59 extends in substantial parallelism with such axis. However, each zone includes the compensating face and the face of geometrical design, these faces being located relative to each other so as to be traversed by the free liquid surface concurrently.

In the practical embodiment of this invention experience shows that certain details of construction contribute to the efficiency and accuracy of the indicating mechanism. For example, the float 42 should preferably be provided with a central opening 65 and a conical cavity 66 at its upper end, to prevent drops of mercury remaining upon the float, when, for example, the instrument is restored to its upright position after having been inverted. The central hole also serves to enable the float to sink a definite distance in the mercury, as it is found that a cylindrical float will not sink to the same point under all working conditions unless such a hole is provided, particularly if there is only a small clearance space between the float and tube 4.

The pins 43 are preferable flattened along their sides, as indicated at 67, Fig. 11, to increase their bearing area on the sides of the helical grooves 44, said flattened surfaces having the same inclination to the vertical as the helical grooves.

The longitudinal slots 45 are also made narrower at one particular place than at other places, for example, by making them slightly wider at the bottom than at the top, as shown in Fig. 11. This construction enables the float to tilt slightly and accommodate itself to inaccuracies in machining of the parts to insure both pins 43 getting an equal bearing against the helical grooves, and to avoid the cramping of the float on the guide which might occur if the bearing were all on one pin.

This type of instrument begins to show an appreciable error at certain speeds when it is tipped to an angle of about 20° to the vertical. This error is due chiefly to the fact that the particles of mercury in the discharge chamber tend to become distorted from their true circular paths when forced to revolve about an inclined axis. Referring to Fig. 19, if the speed of rotation were infinitely great the particle $p$ would travel in a true circular path represented in plan by the circle $p$ $p_1$ $p_2$ $p_3$ $p_4$ and in elevation by the straight line $P—P_4$. Since however it requires an appreciable time for the particle to complete its circuit around the axis it is drawn away from this true circular path by the unbalanced gravity force acting upon it, so that it travels in the distorted path indicated by the dotted lines. This distorted path is non-circular as indicated in plan view and also departs from the original plane of action $P—P_4$, as indicated in elevation. Therefore any arrangement of partitions or guiding surfaces which tend to compel the mercury particles to travel either in planes perpendicular to the axis of rotation or in paths concentric thereto would reduce this error.

Fig. 21 illustrates an arrangement of partitions for compelling the mercury particles to travel in planes perpendicular to the axis of rotation. As illustrated, the hub 68 of the cap 3 is reduced to receive a series of rings 69, which are forced upon the hub with a driving or tight fit, and between each two of which rings is held rigidly a thin metal plate 70. These parallel plates extend out radially nearly to the calibration surface 56, a slight gap being left to permit free flow of the mercury. For the proper circulation of air the plates are further provided with small holes 71 located near the cap hub. Fig. 22 shows another arrangement of partitions for compelling the mercury particles to travel in paths substantially concentric with the axis of rotation. This effect is obtained by providing one of the walls of the discharge chamber, such as the plane surface 60 of body 2 with annular seats or recesses for the cylindrical thin metal partitions 72, which are of increasing height toward the center and which stop just short of the calibration surface 56 and are also provided near their bottoms with holes 73 for permitting free flow of the mercury.

Fig. 20 shows an arrangement of partitions for correcting both errors in travel of the mercury particles. In other words, this arrangement causes the mercury particles to travel both in planes perpendicular to the axis of rotation and also in paths concentric thereto. The partitions, indicated at 74, are secured to the central hub 68 in the same manner illustrated in Fig. 21, but in cross section are of zig-zag form, so that each partition has both horizontal portions 75 and vertical portions 76. The partitions are so formed as to produce clearance spaces therebetween so as to permit free flow of the mercury up, into, and through the several chambers 77 between adjacent partitions.

Other arrangements for producing the same result of course will be obvious to those skilled in the art.

In automobile service the usual practice is to attach the speedometer head to the back of an inclined instrument board so that only the face of the instrument is exposed to view and the glass comes flush with the face of the board. Since it is desirable to keep the rotating axis of this type of instrument approximately vertical I preferably use the novel form of casing shown in Figs. 23 to 26 inclusive, in which the frame member 1 serves also as the lower part of the case and is surmounted by a top casing 78 to which is attached the upper part of the inclined bezel 79 supporting the glass 80 and face plate 81, so that the top casing and glass front form a removable cover which is secured as a unit to the frame 1 by the screws 82. This removable unit is shown in plan view in Fig. 24. Fig. 25 shows a front view of the cover with the front removed. The inclination of the glass front and also of the conical scale of the dial 37 conforms to the inclination of the instrument board 83.

While different views of the drawings show details of the device it is of course understood that the several features shown in Figs. 14, 20 and 23 may all be embodied simultaneously in the form of device illustrated in Fig. 2, and that also various modifications may be resorted to without departing from the scope of the claims appended hereto.

What I claim is:

1. A speed indicator having inner and outer communicating chambers for receiving a liquid, the outer chamber constituting a discharge chamber into which the liquid flows upon rotation, said discharge chamber having a portion thereof bounded by two surfaces traversed by the liquid surface during variations in speed of rotation, one of said surfaces being an assumed cylindrical surface, the surface of the inner chamber being also assumed, the other surface of the outer chamber being calculated with reference to said assumed surfaces in such manner that equal variations in speed throughout a given range produce equal variations in liquid level in the inner chamber.

2. A speed indicator having inner and outer communicating chambers for receiving a liquid, the outer chamber constituting a discharge chamber into which the liquid flows upon rotation, said discharge chamber having inner and outer portions respectively traversed by the liquid surface during variations in the higher and lower ranges of speed, the inner portion of said outer chamber being bounded by two surfaces, one of said surfaces being assumed, the outer portion of said chamber being bounded by two other surfaces, one of said surfaces being assumed, the surface of the inner chamber being also assumed, and the remaining surfaces of the inner and outer portions of the outer chamber being calculated with reference to said assumed surfaces in such manner that equal variations in speed throughout a given range produce equal variations in liquid level in the inner chamber.

3. A speed indicator having inner and outer communicating chambers for receiving a liquid, the outer chamber constituting a discharge chamber into which the liquid flows upon rotation, said discharge chamber having inner and outer portions respectively traversed by the liquid surface during variations in the higher and lower ranges of speed, the inner portion of said outer chamber being bounded by two surfaces, one of which is an assumed substantially horizontally extending base surface, the outer portion of said chamber being bounded by two other surfaces one of which is an assumed substantially cylindrical base surface, the surface of the inner chamber being also assumed, the remaining surfaces of the inner and outer portions of said outer chamber being calculated with reference to said assumed surfaces in such manner that equal variations in speed throughout a given range produce equal variations in liquid level in the inner chamber.

4. A speed indicator provided with communicating chambers for receiving mercury, said mercury being adapted to travel from one chamber to the other upon rotation, and a float supported by the mercury in one of said chambers and by its rise and fall indicating variations in speed of rotation, said float having a vertically extending opening near its center through which mercury readily flows.

5. A speed indicator provided with communicating chambers for receiving mercury, said mercury being adapted to travel from one chamber to the other upon rotation, and a float supported by the mercury in one of said chambers and by its rise and fall indicating variations in speed of rotation, said float having a vertically extending opening near its center through which mercury readily flows and at its top being provided with a concave depression for draining the mercury into said opening.

6. A speed indicator provided with communicating chambers for receiving a liquid, said liquid being adapted to travel from one chamber to the other upon rotation, a float supported by the liquid in one of said chambers and by its rise and fall indicating variations in speed of rotation, said float having a vertically extending opening near its center, a stationary tube surrounding said float and having spirally disposed guiding channels on its inner face, and pins carried by said float and entering said channels.

7. A speed indicator provided with communicating chambers for receiving a liquid, said liquid being adapted to travel from one chamber to the other upon rotation, a float supported by the liquid in one of said chambers and by its rise and fall indicating variations in speed of rotation, said float having a vertically extending opening near its center and at its top being provided with a concave depression draining into said opening, a stationary tube surrounding said float and having spirally disposed guiding channels on its inner face, and pins carried by said float and entering said channels.

8. A speed indicator provided with communicating chambers for receiving a liquid, said liquid being adapted to travel from one chamber to the other upon rotation, a float supported by the liquid in one of said chambers and by its rise and fall indicating variations in speed of rotation, said float having a vertically extending opening near its center, a stationary tube surrounding said float and having spirally disposed guiding channels on its inner face, and pins carried by said float and entering said channels, the sides of said pins being flattened off to provide extended bearing surfaces with the sides of said channels.

9. A speed indicator provided with communicating chambers for receiving a liquid, said liquid being adapted to travel from one chamber to the other upon rotation, a float supported by the liquid in one of said chambers and by its rise and fall indicating variations in speed of rotation, said float having a vertically extending opening near its center and at its top being provided with a concave depression draining into said opening, a stationary tube surrounding said float and having spirally disposed guiding channels on its inner face, and pins carried by said float and entering said channels, the sides of said pins being flattened off to provide extended bearing surfaces with the sides of said channels.

10. A speed indicator provided with communicating chambers for receiving a liquid, said liquid being adapted to flow from chamber to chamber during rotation, a float supported by the liquid in one of said chambers, means whereby the rise and fall of said float causes rotation thereof, said float being provided with vertically extending grooves in its outer surface, and a frame actuated by rotation of said float and provided with vertically extending arms working in said grooves.

11. A speed indicator provided with communicating chambers for receiving a liquid, said liquid being adapted to flow from chamber to chamber during rotation, a float supported by the liquid in one of said chambers, means whereby the rise and fall of said float cause rotation thereof, said float being provided with vertically extending grooves in its outer surface, and a frame actuated by rotation of said float and provided with vertically extending arms working in said grooves, said grooves being narrower at one point than elsewhere to enable the float to accommodate itself to said arms.

12. A speed indicator provided with inner and outer communicating chambers for receiving a liquid and including a rotatable member whose rotation produces flow of the liquid from the inner to the outer chamber during variations in speed of rotation, a movable dial actuated by the rise and fall of the liquid in the inner chamber, and a dome enclosing said rotatable member and separating it from said dial to protect the dial from the effects of air currents caused by said rotatable member.

13. A speed indicator provided with inner and outer communicating chambers for receiving a liquid and including a rotatable member whose rotation produces flow of the liquid from the inner to the outer chamber during variations in speed of rotation, an inverted cup-shaped dial actuated by the rise and fall of liquid in the inner chamber for indicating variations in speed of rotation, and a stationary dome lying between the dial and rotatable member to protect the dial from the effects of air currents caused by said rotatable member.

14. A speed indicator provided with inner and outer communicating chambers for receiving a liquid, means for producing rotation of the liquid in said outer chamber about a central axis to cause flow of liquid to said outer chamber upon variations in speed of rotation, and means for compelling travel of the liquid particles in circles concentric with said axis when said axis is inclined to the vertical.

15. A speed indicator provided with inner and outer communicating chambers for receiving a liquid, means for producing rotation of the liquid in said outer chamber about a central axis to cause flow of liquid to said outer chamber upon variations in speed of rotation, and means for compelling travel of the liquid particles in planes perpendicular to said axis when said axis is inclined to the vertical.

16. A speed indicator provided with inner and outer communicating chambers for receiving a liquid, means for producing rotation of the liquid in said outer chamber about a central axis to cause flow of liquid to said outer chamber upon variations in speed of rotation, and means for compelling travel of the particles of liquid in circles concentric with said axis and in planes perpendicular thereto when said axis is inclined to the vertical.

17. A speed indicator provided with inner and outer communicating chambers for receiving a liquid, means for producing rotation of the liquid in said outer chamber about a central axis to cause flow of liquid to said outer chamber upon variations in speed of rotation, and a series of spaced cylindrical walls within said outer chamber and concentric with said axis for compelling travel of the particles of liquid in circles concentric with said axis when said axis is inclined to the vertical.

18. A speed indicator provided with inner and outer communicating chambers for receiving a liquid, means for producing rotation of the liquid in said outer chamber about a central axis to cause flow of liquid to said outer chamber upon variations in speed of rotation, and a series of spaced parallel walls in said chamber perpendicular to said axis for compelling travel of the particles of liquid in planes perpendicular to said axis when said axis is inclined to the vertical.

19. A speed indicator provided with inner and outer communicating chambers for receiving a liquid, means for producing rotation of the liquid in said outer chamber about a central axis to cause flow of liquid to said outer chamber upon variations in speed of rotation, and a series of circumferentially extending walls in said chamber concentric with said axis and in planes perpendicular thereto for controlling the travel of the liquid particles when said axis is inclined to the vertical.

20. A speed indicator, comprising an outer casing having a dome shaped upper portion provided with an inclined front face and a depending tubular body portion, the dome shaped upper portion of the casing and inclined face being removable as a unit from the body portion of said casing, a rotatable member within said casing, and a dial actuated by rotation of said member and visible through an opening in the inclined portion of said casing.

21. In speed indicators, wherein a confined liquid mass is subjected to centrifugal action to produce characteristics of a vortex, wherein the carrier for the liquid mass is formed to provide inner and outer chambers in permanent communication and with each chamber having a free liquid surface of the mass, the free surfaces being in permanent connection through the body of the mass, and wherein the indications are made responsive to the changes in position of the free liquid surface of the mass of the inner chamber, means operative to establish definite positions of equilibrium of the mass at definite speeds of rotation in presence of mass increment flow produced by variations in speed, said means including a succession of faces of the outer chamber positioned to be traversed successively by the free liquid surface operating in such chamber, each face having a cross-sectional contour of mathematically-derived characteristic such as to cause the volumetric displacement represented by the movement of the free liquid surface of such outer chamber in traversing said faces during movement from one position of mass equilibrium to another to be equal for equal increments of speed.

22. In speed indicators, wherein a confined liquid mass is subjected to centrifugal action to produce characteristics of a vortex, wherein the carrier for the liquid mass is formed to provide inner and outer chambers in permanent communication and with each chamber having a free liquid surface of the mass, the free surfaces being in permanent connection through the body of the mass, and wherein the indications are made responsive to the changes in position of the free liquid surface of the mass of the inner chamber, means operative to establish definite positions of equilibrium of the mass of definite speeds of rotation in presence of mass increment flow produced by variations in speed, said means including a succession of communicating zones of compensation located within the path of travel of the free liquid surface of the outer chamber, each zone being operative to produce positions of liquid mass equilibrium wherein equal increments of speed provide equal increments of the mass displaced within the chambers, each zone having a wall configuration to provide a pair of faces adapted to be concurrently traversed by such free liquid surface in moving from one position of mass equilibrium to another within the zone, one of said zone faces being of mathematically-derived contour characteristic in cross-section of the face, each zone being active to cause the volumetric displacement represented by the movement of the free liquid surface between such positions of mass equilibrium to be equal for equal increments of speed.

23. In speed indicators, wherein a confined liquid mass is subjected to centrifugal action to produce characteristics of a vortex, wherein the carrier for the liquid mass is formed to provide inner and outer chambers in permanent communication and with each chamber having a free liquid surface of the mass, the free surfaces being in permanent connection through the body of the mass, and wherein the indications are made responsive to the changes in position of the free liquid surface of the mass of the inner chamber, means operative to establish definite positions of equilibrium of the mass at definite speeds of rotation in presence of mass increment flow produced by variations in speed, said means including a succession of communicating zones of compensation located within the path of travel of the free liquid surface of the outer chamber, each zone being operative to produce positions of liquid mass equilibrium wherein equal increments of speed provide equal increments of the mass displaced within the chambers, each zone having a wall configuration to provide a pair of faces adapted to be concurrently traversed by such free liquid surface in moving from one position of mass equilibrium to another within the zone, one of said zone faces being of mathematically-derived contour characteristic in cross-section of the face, each zone being active to cause the volumetric displacement represented by the movement of the free liquid surface between such positions of mass equilibrium to be equal for equal increments of speed, the derived faces of succeeding zones being relatively positioned to render one face inactive as a compensating face during periods of activity of the derived face of the adjacent zone as a compensation face.

24. In speed indicators, wherein a confined liquid mass is subjected to centrifugal action to produce characteristics of a vortex, wherein the carrier for the liquid mass is formed to provide inner and outer chambers in permanent communication and with each chamber having a free liquid surface of the mass, the free surfaces being in permanent connection through the body of the mass, and wherein the indications are made responsive to the changes in position of the free liquid surface of the mass of the inner chamber, means operative to establish definite positions of equilibrium of the mass at definite speeds of rotation in presence of mass increment flow produced by variations in speed, said means including a succession of communicating zones of compensation located within the path of travel of the free liquid surface of the outer chamber, each zone being operative to produce positions of liquid mass equilibrium wherein equal increments of speed provide equal increments of the mass displaced within the chambers, each zone having a wall configuration to provide a pair of faces adapted to be concurrently traversed by such free liquid surface in moving from one position of mass equilibrium to another within the zone, one of said zone faces being of mathematically-derived contour characteristic in cross-section of the face, each zone being active to cause the volumetric displacement represented by the movement of the free liquid surface between such positions of mass equilibrium to be equal for equal increments of speed, the derived faces of succeeding zones being relatively positioned to render one face inactive as a compensating face during periods of activity of the derived face of the adjacent zone as a compensation face, activity of the inactive compensating face of adjacent zones being in immediate succession to the inactivity of the active compensation face of the adjacent zone during the movement of the free liquid surface from one zone to the other.

25. In speed indicators, wherein a confined liquid mass is subjected to centrifugal action to produce characteristics of a vortex, wherein the carrier for the liquid mass is formed to provide inner and outer chambers in permanent communication and with each chamber having a free liquid surface of the mass, the free surfaces being in permanent connection through the body of the mass, and wherein the indications are made responsive to the changes in position of the free liquid surface of the mass of the inner chamber, means operative to establish definite positions of equilibrium of the mass at definite speeds of rotation in presence of mass increment flow produced by variations in speed, said means including a succession of communicating zones of compensation located within the path of travel of the free liquid surface of the outer chamber, each zone being operative to produce positions of liquid mass equilibrium wherein equal increments of speed provide equal increments of the mass displaced within the chambers, each zone having a wall configuration to provide a pair of faces adapted to be concurrently traversed by such free liquid surface in moving from one position of mass equilibrium to another within the zone, one of said zone faces being of selected geometrical design with the other of said zone faces of mathematically-derived contour charactertistic in cross-section of the face, each zone being active to cause the volumetric displacement represented by the movement of the free liquid surface between such positions of mass equilibrium to be equal for equal increments of speed.

26. An indicator as in claim 25 characterized in that the geometrical design faces of the several zones bear different geometrical relations to the axis of rotation of the carrier.

27. An indicator as in claim 25 characterized in that a cross-section of the geometrical design face of one of such zones presents the face as extending substantially perpendicular to the axis of rotation of the carrier.

28. An indicator as in claim 25 characterized in that a cross-section of the geometrical design face of one of such zones presents the face as extending substantially parallel to the axis of rotation of the carrier.

29. An indicator as in claim 25 characterized in that a cross-section of the geometrical design face of one of such zones presents the face as extending substantially perpendicular to the axis of rotation of the carrier, a cross-section of the geometrical design face of the adjacent zone presenting the face as extending in substantial parallelism with such axis of rotation.

In testimony whereof I affix my signature.

EMERY J. WILSON.